United States Patent
Bi et al.

(10) Patent No.: US 9,596,659 B2
(45) Date of Patent: Mar. 14, 2017

(54) APPARATUS, METHOD AND SYSTEM OF CONTROLLING COMMUNICATIONS OF A MULTI-RADIO DEVICE

(71) Applicant: INTEL CORPORATION, Santa Clara, CA (US)

(72) Inventors: Dongsheng Bi, Fremont, CA (US); Keren Dor, Herzelyia (IL); Assi Jakoby, Herzelia (IL); Itzik Shahar, Kadima (IL); Bruno Jechoux, Antibes (FR); Lars Persson, Grafing (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/494,672

(22) Filed: Sep. 24, 2014

(65) Prior Publication Data

US 2016/0088572 A1 Mar. 24, 2016

(51) Int. Cl.
*H04W 52/24* (2009.01)
*H04W 52/32* (2009.01)
*H04W 4/00* (2009.01)

(52) U.S. Cl.
CPC ......... *H04W 52/241* (2013.01); *H04W 4/008* (2013.01); *H04W 52/322* (2013.01); *H04W 52/243* (2013.01)

(58) Field of Classification Search
CPC . H04W 4/008; H04W 52/241; H04W 52/243; H04W 52/544
See application file for complete search history.

(56) References Cited

U.S. PATENT DOCUMENTS

| | | | | |
|---|---|---|---|---|
| 8,116,684 B2* | 2/2012 | Gao | ........................ | H04B 1/715 370/337 |
| 8,364,080 B2* | 1/2013 | Desai | ..................... | H04W 16/14 455/41.2 |
| 8,681,748 B2* | 3/2014 | Medapalli | .............. | H04B 1/406 370/334 |
| 8,693,950 B2* | 4/2014 | Desai | .................. | H04W 52/242 370/337 |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Lewis West
(74) *Attorney, Agent, or Firm* — Shichrur & Co.

(57) ABSTRACT

Some demonstrative embodiments include devices, systems and methods of controlling communications of a multi-radio device. For example, a multi-radio device may include a cellular controller to control communication of a cellular radio; and a BT controller to control a transmission power of a BT radio according to a first power level, the BT controller is to receive from the cellular controller an indication of a cellular downlink period, and, during the cellular downlink period, to restrict a transmission power of at least one BT discovery packet to no more than a second power level, which is less than the first power level.

24 Claims, 5 Drawing Sheets

(56) References Cited

U.S. PATENT DOCUMENTS

| | | | | |
|---|---|---|---|---|
| 2009/0176454 A1* | 7/2009 | Chen | ................... | H04W 16/14 |
| | | | | 455/63.1 |
| 2012/0093009 A1* | 4/2012 | Wang | ................... | H04W 16/14 |
| | | | | 370/252 |
| 2013/0010766 A1* | 1/2013 | Sadek | ............... | H04W 72/1215 |
| | | | | 370/336 |
| 2014/0087785 A1* | 3/2014 | Smadi | .................. | H04J 11/0023 |
| | | | | 455/552.1 |

OTHER PUBLICATIONS

Bluetooth Specification Version 4.1, Specification of the Bluetooth System; Covered Core Package version: 4.1, Dec. 3, 2013, 2684 pages.
Bluetooth Specification Version 1.0 B, Specification of the Bluetooth System, Wireless connections made easy; Dec. 1, 1999, 1082 pages.
Bluetooth Specification Version 4.0, Specification of the Bluetooth System Experience More, Covered Core Package version: 4.0, Current Master TOC, Jun. 30, 2010, 2302 pages.
ETSI TS 136 300 V11.3.0 (Nov. 2012); LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11); Nov. 2012; 217 pages.

* cited by examiner

APPARATUS, METHOD AND SYSTEM OF CONTROLLING COMMUNICATIONS OF A MULTI-RADIO DEVICE

TECHNICAL FIELD

Embodiments described herein generally relate to multi-radio devices.

BACKGROUND

Some wireless communication devices ("multi-radio devices"), for example, mobile devices, e.g., Smartphones, mobile computers, and the like, may include multiple co-located radios, which may be configured, for example, to communicate according to a plurality of radio technologies.

For example, a multi radio device may include a Bluetooth (BT) radio, a cellular radio, a Wireless Local Area Network (WLAN) radio, and/or any other radio.

Two or more radios of the multi-radio device may communicate over adjacent and/or overlapping wireless communication frequency bands and/or channels. For example, a cellular radio, e.g., a Long-Term Evolution (LTE) radio, may operate in a frequency band, which may be adjacent to a frequency band utilized by a BT radio, and/or a WLAN radio, e.g., a Wireless Fidelity (WiFi) radio. As a result, communications performed by the radios of the multi-radio device may interfere with one another.

The multi-radio device may utilize a coexistence mechanism to mitigate the interference between the radios. For example, the Bluetooth Specification version 4.1, Dec. 3, 2013, defines a Mobile Wireless Standards (MWS) Coexistence mechanism implemented by co-located BT and MWS devices to control and/or coordinate communications performed by the radios.

Coordinating between communications of a plurality of wireless communication networks may be a complex task, as each wireless communication network may have different requirements and/or may impose different constraints.

As a result, existing coexistence mechanisms are suboptimal, in the sense that they do not provide optimal utilization of the frequency bands, and may result in degraded performance of one or more of the wireless communication networks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Bluetooth standards ("the Bluetooth Standards"), e.g., including Bluetooth specification V 1.0, Dec. 1, 1991, Bluetooth specification V 4.1, Dec. 3, 2013, and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE 802.11 task group ai (TGai)) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) ("the LTE Standards) (including ETSI TS 136 300 V11.3.0 (2012-11): LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11), 2012), and/or future versions and/or derivatives thereof, units and/or devices which are part of the above networks, and the like.

Some embodiments may be used in conjunction with one way and/or two-way radio communication systems, multi-radio devices, cellular radio-telephone communication systems, multi-radio communication systems, Bluetooth communication systems, a User Equipment (UE), a mobile device, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, a Mobile Internet Device (MID), or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Single Carrier Frequency-Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), BT, BLE, Wi-Fi, Wi-Max, Zig-Bee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wireless Fidelity (WiFi) network, or a WLAN according to the IEEE 802 Standards (also referred to as "the 802 network"). Other embodiments may be used in conjunction with any other suitable wireless communication network, for example, a wireless area network, a "piconet", a WPAN, a WVAN and the like.

Some demonstrative embodiments are described herein with respect to a LTE cellular network. However, other embodiments may be implemented in any other suitable cellular network, e.g., a 3G cellular network, a 4G cellular network, a 5G cellular network, a WiMax cellular network, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Figure 1:
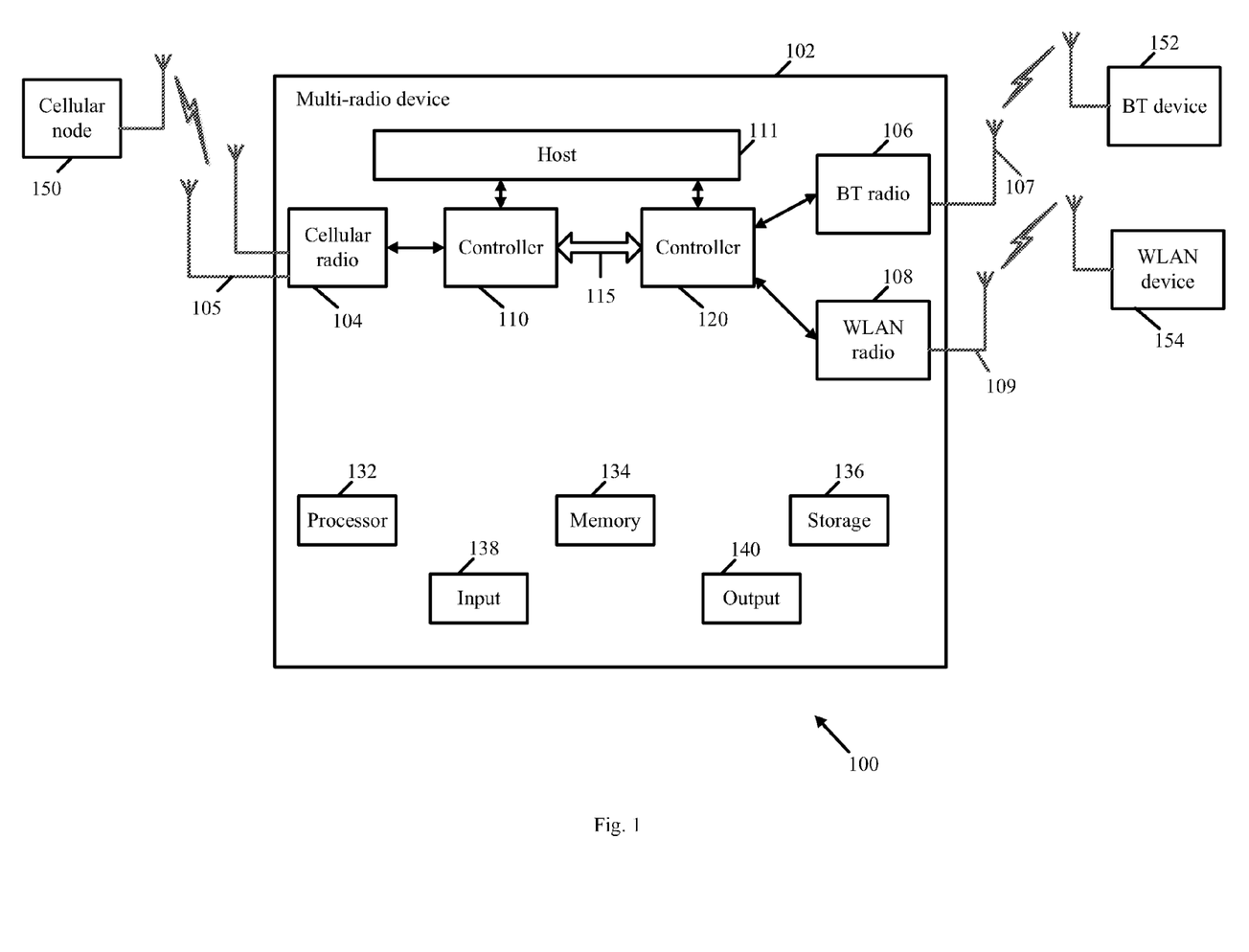
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

In some demonstrative embodiments, system 100 may include a multi-radio device 102 configured to communicate with one or more wireless communication devices of one or more wireless communication networks.

In some demonstrative embodiments, multi-radio device 102 may include a plurality of co-located radios, which may be configured to communicate according to a plurality of radio technologies.

In some demonstrative embodiments, multi-radio device 102 may include a cellular radio 104 configured to communicate with one or more cellular devices, e.g., a cellular node 150 and/or any other cellular device, of a cellular wireless communication network. For example, cellular radio 104 may be configured to communicate with a Global System for Mobile (GSM) network, a Universal Mobile Telecommunications System (UMTS) network, a Long Term Evolution (LTE) network, an LTE-advanced network, a Fifth Generation (5G) network, or any other cellular network.

In some demonstrative embodiments, cellular radio 104 may include a multiple input multiple output (MIMO) transmitters receivers system (not shown), which may be capable of performing antenna beamforming methods. For example, cellular radio 104 may include, for example, a turbo decoder and/or a turbo encoder (not shown) to encode and/or decode data bits into data symbols. In other embodiments, cellular radio 104 may include any other encoder and/or decoder.

In some demonstrative embodiments, cellular radio 104 may include OFDM, OFDMA and/or SC-FDMA modulators and/or demodulators (not shown) configured to communicate OFDM or OFDMA signals over downlink channels, e.g., between cellular node 150 and multi-radio device 102, and/or SC-FDMA signals over uplink channels, e.g., between multi-radio device 102 and cellular node 150. In other embodiments, cellular radio 104 may include any other modulators and/or demodulators.

In some demonstrative embodiments, multi-radio device 102 may include a Bluetooth (BT) radio 106 configured to communicate with at least one BT device 152 of a BT wireless communication network, e.g., according to a secure BT communication protocol, a BLE communication protocol, and/or any other BT communication protocol.

In some demonstrative embodiments, multi-radio device 102 may include any other radio configured to communicate with any other wireless communication device. For example, multi-radio device 102 may include a Wireless Local Area Network (WLAN) radio 108 to communicate with a WLAN device 154 of a WLAN. For example, WLAN radio 108 may be configured to communicate with WLAN device 154 over a Wireless Fidelity (WiFi) link, a Point to Point (P2P) link, a WiFi Direct (WFD) link, a Wireless Gigabit (WiGig) link, or any other link.

Some embodiments are described herein with respect to a multi-radio device, e.g., multi-radio device 102, including three radios, e.g., cellular radio 104, BT radio 106 and WLAN radio 108. However, in other embodiments, the multi-radio device may include any other number of radios, e.g., two radios or more than three radios. In one example, the multi-radio device may include two radios, e.g., a cellular radio and a BT radio, and/or any other combination of radios. In another example, the multi-radio device may include more than three radios, e.g., including one or more cellular radios, one or more BT radios, one or more WLAN radios, one or more Mobile Wireless Standards (MWS) radios, and/or any other radios.

In some demonstrative embodiments, multi-radio device 102 may include a cellular controller 110 to control cellular radio 104, and a controller 120 (also referred to as "BT controller") to control BT radio 106, e.g., as described below.

In some demonstrative embodiments, controller 120 may control WLAN radio 108. In other embodiments, WLAN radio 108 may be controlled by any other controller.

In some demonstrative embodiments, controllers 110 and/or 120 may include suitable circuitry, e.g., processor circuitry, memory circuitry, Media-Access Control (MAC) circuitry, Physical Layer (PHY) circuitry, and/or any other circuitry, which may be configured to perform at least part of the functionality of controllers 110 and/or 120.

In some demonstrative embodiments, cellular controller 110 may be implemented as part of radio 104, e.g., radio 104 may perform at least part of the functionality of cellular controller 110; and/or controller 120 may be implemented as part of radio 106, e.g., radio 106 may perform at least part of the functionality of cellular controller 110.

In some demonstrative embodiments, radios 104 and/or 106 may include, for example, one or more wireless transmitters, receivers and/or transceivers able to send and/or receive wireless communication signals, RF signals, frames, blocks, transmission streams, packets, messages, data items, and/or data. In one example, radios 104 and/or 106 may include circuitry, modulation elements, demodulation elements, amplifiers, analog to digital and digital to analog converters, filters, and/or the like.

In some demonstrative embodiments, radios 104 and/or 106 may include or may be implemented as part of one or more wireless Network Interface Cards (NICs), and the like.

In one example, cellular radio 104 and BT radio 106 may be implemented as part of a single NIC, e.g., capable of providing cellular and BT communication functionalities. In another example, cellular radio 104 and BT radio 106 may be implemented by two or more separate NICs.

In some demonstrative embodiments, cellular controller 110 may control cellular radio 104 to communicate between a host application ("host") 111 of multi-radio device 102 and cellular node 150, and/or BT controller 120 may control BT radio 106 to communicate between host 111 and BT device 152.

In some demonstrative embodiments, cellular radio 104 may include, or may be associated with, one or more antennas 105, e.g., two or more antennas, BT radio 106 may include, or may be associated with, one or more antennas 107, and/or WLAN radio 108 may include, or may be associated with, one or more antennas 109.

In some demonstrative embodiments, antennas 105, 107 and/or 109 may include any type of antennas suitable for transmitting and/or receiving wireless communication signals, blocks, frames, transmission streams, packets, messages and/or data. For example, antennas 105, 107 and/or 109 may include any suitable configuration, structure and/or arrangement of one or more antenna elements, components, units, assemblies and/or arrays. For example, antennas 105, 107 and/or 107 may include a phased array antenna, a dipole antenna, a single element antenna, a set of switched beam antennas, and/or the like.

In some embodiments, antennas 105, 107 and/or 109 may implement transmit and receive functionalities using separate transmit and receive antenna elements. In some embodiments, antennas 105, 107 and/or 109 may implement transmit and receive functionalities using common and/or integrated transmit/receive elements.

In some demonstrative embodiments, antennas 105, 107 and 109 may utilize one or more separate antenna elements.

In some demonstrative embodiments, antennas 105, 107 and 109 may utilize one or more shared antenna elements.

In some demonstrative embodiments, multi-radio device 102 may include or may be implemented as part a mobile device, for example, a User Equipment (UE), a Mobile Device (MD), a mobile Station (STA), a Subscriber Station (SS), a Mobile Unit (MU), a mobile computer, a laptop computer, an Ultrabook™ computer, a notebook computer, a tablet computer, a handheld computer, a handheld device, a BT device, a BLE device, a cellular device, a cellular phone, a Smartphone, a PDA device, a handheld PDA device, an on-board device, an off-board device, a consumer device, a vehicular device, a non-vehicular device, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a television, a music player, or the like. In other demonstrative embodiments, multi-radio device 102 may include a static or non-portable device, for example, a non-mobile computing device, a desktop computer, a non-portable consumer device, a communication node, a communication station, or the like.

In some demonstrative embodiments, multi-radio device 102 may include, for example, one or more of a processor 132, an input unit 138, an output unit 140, a memory unit 134, and a storage unit 136. Multi-radio device 102 may optionally include other suitable hardware components and/or software components. In some demonstrative embodiments, some or all of the components of multi-radio device 102 may be enclosed in a common housing or packaging, and may be interconnected or operably associated using one or more wired or wireless links. In other embodiments, components of one or more of multi-radio device 102 may be distributed among multiple or separate devices.

Processor 132 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 132 executes instructions, for example, of an Operating System (OS) of multi-radio device 102 and/or of one or more suitable applications.

Input unit 138 includes, for example, a keyboard, a keypad, a mouse, a touch-screen, a touch-pad, a track-ball, a stylus, a microphone, or other suitable pointing device or input device. Output unit 140 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 134 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 136 includes, for example, a hard disk drive, a floppy disk drive, a Compact Disk (CD) drive, a CD-ROM drive, a DVD drive, or other suitable removable or non-removable storage units. Memory unit 134 and/or storage unit 136, for example, may store data processed by multi-radio device 102.

In some demonstrative embodiments, cellular radio 104 may be configured to communicate over one or more cellular frequency bands of a cellular communication network, and/or BT radio 106 may be configured to communicate over one or more BT frequency bands of a BT communication network.

In some demonstrative embodiments, one or more of the cellular frequency bands may be adjacent to and/or may overlap, partially or entirely, one or more of the BT frequency bands, e.g., as described below.

In one example, the cellular frequency bands may include a frequency band of 2300-2400 Megahertz (MHz), a frequency band of 2496-2690 MHz, a frequency band of 2500-2570 MHz, a frequency band of 2570-2620 MHz, a frequency band of 2620-2690 MHz, and/or any other frequency band.

In one example, the BT frequency bands may include the frequency band of 2400-2483 Mhz, and/or any other frequency band.

In some demonstrative embodiments, radios 104 and/or 106 may be configured to communicate according to any other wireless communication technology, and/or over any other frequency bands.

In some demonstrative embodiments, multi-radio device 102 may include any additional or alternative radios configured to communicate according to any other wireless communication technology, and/or over any other frequency bands.

In some demonstrative embodiments, the proximity and/or overlap between the cellular frequency bands and the BT frequency bands may potentially result in interfere between communications performed by radios 104 and 106.

In some demonstrative embodiments, multi-radio device 102 may utilize a coexistence mechanism to control and/or coordinate communications by radios 104, 106 and/or 108.

In some demonstrative embodiments, the coexistence mechanism may include a MWS coexistence mechanism.

For example, cellular controller 110 may perform the functionality of a MWS controller, and/or controller 120 may perform the functionality of a BT and/or a WLAN (BT/WLAN) controller.

In some demonstrative embodiments, the coexistence mechanism may be configured to control, reduce and/or mitigate interference between communications performed by radios 104, 106 and/or 108, e.g., as described below.

In some demonstrative embodiments, multi-radio device 102 may include an interface 115 to communicate signaling messages between controllers 110 and 120.

In some demonstrative embodiments, the signaling messages may be configured to enable controllers 110 and 120 to exchange information and support cooperative coexistence between radios 104, 106 and 108, e.g., as described below.

In some demonstrative embodiments, the signaling messages may include MWS signaling messages between a MWS controller, e.g., cellular controller 110, and a WLAN/BT controller, e.g., controller 120.

In some demonstrative embodiments, interface 115 may include a real-time transport interface to transport logical signaling messages between controllers 110 and 120.

In some demonstrative embodiments, interface 115 may transfer the signaling messages between radio 104 and radio 106 and/or radio 108, for example, if radio 104 performs at least part of the functionality of cellular controller 110, and/or radio 106 performs at least part of the functionality of BT controller 120.

In some demonstrative embodiments, interface 115 may include a universal asynchronous receiver/transmitter (UART) interface, e.g., a UART interface including two lines. In other embodiments, interface 115 may include any other type of interface.

In some demonstrative embodiments, cellular controller 110, BT controller 120 and/or interface 115 may be configured to coordinate between radios 104, 106 and/or 108 in accordance with requirements and/or constraints of the BT Standards, the IEEE 802.11 Standards, the LTE Standards, and/or any other standard, specification and/or protocol.

In some demonstrative embodiments, cellular controller 110 may be configured to coordinate and/or manage a distribution of communication resources between radio 104 and radios 106 and/or 108. For example, controller 120 may request from cellular controller 110 permission for radios 106 and/or 108 to transmit and/or receive, cellular controller 110 may decide whether to grant or deny the request to transmit or receive, and cellular controller 110 may indicate to controller 120 whether the request to transmit and/or receive is granted or denied, e.g., as described below.

In other embodiments, BT controller 120 may be configured to coordinate and/or manage a distribution of communication resources between radio 104 and radios 106 and/or 108. For example, cellular controller 110 may request from BT controller 120 permission for radios 106 and/or 108 to transmit and/or receive, BT controller 120 may decide whether to grant or deny the request to transmit or receive, and controller 120 may indicate to cellular controller 110 whether the request to transmit and/or receive is granted or denied. In other embodiments, the coordination and/or management of the communication resources may be distributed between controllers 110 and 120.

In some demonstrative embodiments, communication by cellular radio 104 over the cellular network may be subject to various constraints defined by the cellular network. For example, cellular radio 104 may be allowed to discard a very small percentage, e.g., less than 10%, of uplink and/or downlink traffic communicated by cellular radio 104. As a result, cellular controller 110 may arbitrate between cellular radio 104 and radios 106 and 108 in a manner, which may be more favorable to communications performed by radio 104, while communications by radios 106 and 108 may be provided with a reduced priority. Accordingly, communication performed by radios 106 and 108 may suffer degraded performance, as result of the preference of the communications performed by cellular radio 104.

In some demonstrative embodiments, the communications performed by cellular radio 104 may be during a cellular uplink period, e.g., from device 102 to cellular node 150.

In some demonstrative embodiments, the communications performed by cellular radio 104 may be during a cellular downlink period, e.g., from cellular node 150 to device 102.

In some demonstrative embodiments, the cellular downlink period may include a downlink subframe period of cellular radio 104.

In some demonstrative embodiments, cellular radio 104 may communicate over a cellular frequency during the cellular downlink period. For example, the cellular frequency may include a frequency of the cellular frequency bands.

In some demonstrative embodiments, BT radio 106 may establish a connection between device 102 and one or more BT devices, e.g., device 152.

In some demonstrative embodiments, BT radio 106 may transmit BT discovery packets over the BT wireless communication network, for example, to establish the connection between device 102 and BT device 152 over a BT wireless communication network.

In some demonstrative embodiments, the BT discovery packets may include connection packets configured to establish a connection between device 102 and one or more other BT devices.

In some demonstrative embodiments, the BT discovery packets may include BT inquiry packets and/or BT paging packets.

In one example, the BT discovery packets may include BT inquiry IDentity (ID) and/or paging ID packets.

In some demonstrative embodiments, BT radio 106 may transmit the BT discovery packets at a BT frequency. For example, the BT frequency may include a frequency of the BT frequency bands.

In some demonstrative embodiments, BT controller 120 may control transmission power of BT radio 106 according to a first power level ("the default power level").

In one example, the first power level may include a default transmission power level of BT radio 106. For example, the default power level may include a maximum transmission power of BT radio 106.

In some demonstrative embodiments, controller 120 may be configured to block and/or terminate ("kill") the BT discovery packets, e.g., based on an instruction from controller 110, for example, if the BT discovery packets interfere with the communications performed by cellular radio 104.

In some demonstrative embodiments, the BT discovery packets may interfere with the communications performed by cellular radio 104, for example, if the BT discovery packets are transmitted during the cellular downlink period of cellular radio 104.

In some demonstrative embodiments, the BT discovery packets may interfere cellular radio 104 during the cellular downlink period, for example, if the BT frequency is adjacent to and/or overlaps, partially or entirely, the cellular frequency.

In some demonstrative embodiments, the BT discovery packets may interfere with cellular radio 104, for example, if the BT discovery packets are transmitted according to the default power level and the BT frequency interfere with the cellular frequency.

In one example, controller 110 may instruct controller 120 to block and/or terminate the BT discovery packets, for example, if the BT discovery packets are transmitted according to the default power level at a BT frequency, which interferes with a reception of the communication of cellular radio 104 during the cellular downlink period.

In some demonstrative embodiments, controller 120 may enable BT radio 106 to transmit the BT discovery packets, for example, during the cellular downlink period.

In some demonstrative embodiments, controller 120 may enable BT radio 106 to transmit the BT discovery packets during the cellular downlink period, for example, even if the BT frequency impacts the cellular frequency.

In some demonstrative embodiments, controller 120 may reduce the transmission power of BT radio 106, for example, to enable transmission of the BT discovery packets during the cellular downlink period, e.g., without interfering cellular radio 104.

In some demonstrative embodiments, BT controller 120 may reduce the transmission power of BT radio 106 during the cellular downlink period, e.g., as described below.

In some demonstrative embodiments, BT controller 120 may receive from cellular controller 110, e.g., via interface 115, an indication of the cellular downlink period.

In some demonstrative embodiments, during the cellular downlink period, BT controller 120 may restrict a transmission power of at least one BT discovery packet to no more than a second power level ("the reduced power level").

In some demonstrative embodiments, the reduced power level may be less than the first power level, e.g., less than the default power level.

In some demonstrative embodiments, the reduced power level may include, for example, a maximum allowed power level of BT radio 104, during the cellular downlink period.

In one example, the reduced power level may include a power level, which may not affect, or may marginally affect, a quality of reception of cellular radio 104 during the cellular downlink period.

In some demonstrative embodiments, cellular controller 110 may determine the reduced power level, and may send to BT controller 120 an indication of the reduced power level, e.g., via interface 115.

In some demonstrative embodiments, an initial value of the reduced power level ("the initial reduced power") may be predefined and stored in device 102, e.g., in storage 136, in BT controller 120, and/or in memory 134.

In one example, the initial reduced power may be determined based on a worst-case scenario, for example, according to a reference receive sensitivity of cellular radio 104.

In some demonstrative embodiments, cellular controller 110 may dynamically update the reduced power level.

In some demonstrative embodiments, cellular controller 110 may dynamically update the reduced power level, based on a cellular channel noise, e.g., as described below.

In some demonstrative embodiments, cellular controller 110 may determine a first cellular channel noise level of cellular radio 104 based on the default power level. For example, cellular controller 110 may determine the first cellular channel noise level assuming transmission of BT radio 106 at the default, e.g., maximum, transmission power.

In some demonstrative embodiments, cellular controller 110 may determine a second cellular channel noise level of cellular radio 104 based on one or more cellular channel parameters.

For example, cellular controller 110 may determine the second cellular channel noise level based on a Reference Signal Received Power (RSRP) parameter and/or a Reference Signal Received Quality (RSRQ) parameter.

In some demonstrative embodiments, cellular controller 110 may determine the second cellular channel noise level using a calculation assuming no affect of transmissions by BT radio 106.

In some demonstrative embodiments, cellular controller 110 may apply a noise margin to the second power level.

In some demonstrative embodiments, the noise margin may be added to the second cellular channel noise.

In one example, the noise margin may include a predefined noise level, e.g., of 6 dB, or any other value.

In some demonstrative embodiments, cellular controller 110 may dynamically update the reduced power level, based on the first and second cellular channel noise levels, e.g., as describe below with reference to FIG. 2.

Figure 2:
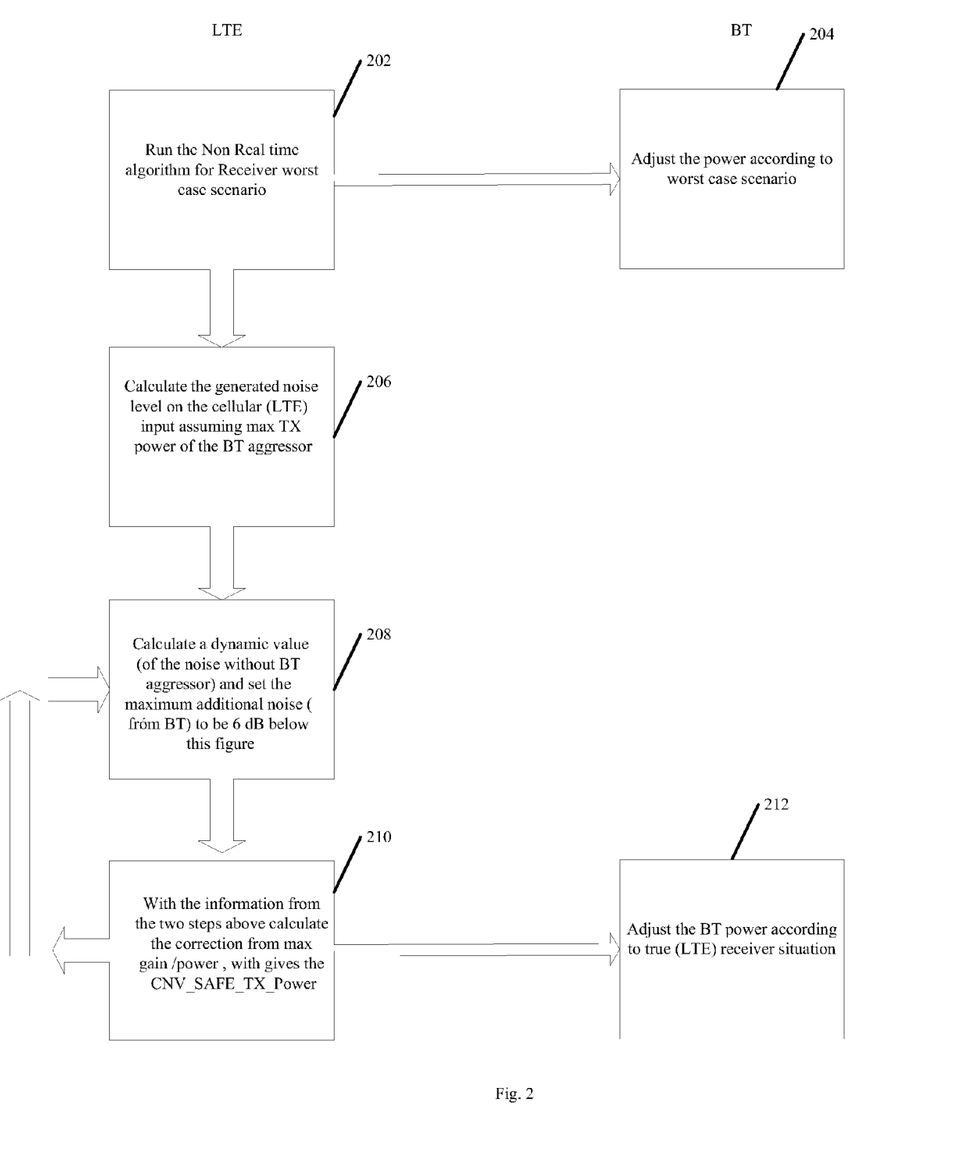
FIG. 2 is a schematic flow-chart illustration of a method of updating a reduced power level, in accordance with some demonstrative embodiments.

Reference is made to FIG. 2, which schematically illustrates a method of updating a reduced power level, in accordance with some demonstrative embodiments. In some demonstrative embodiments, one or more of the operations of the method of FIG. 2 may be performed by one or more elements of a system, e.g., system 100 (FIG. 1). In one example, one or more of the operations of the method of FIG. 2 may be performed at a multi-radio device, e.g., multi-radio device 102 (FIG. 1), for example, by a controller, e.g., cellular controller 110 (FIG. 1) and/or BT controller 120 (FIG. 1).

In some demonstrative embodiments, one or more of the operations of the method of FIG. 2 may be performed by a cellular controller, e.g., cellular controller 110 (FIG. 1), to dynamically update a reduced power level of a BT radio, e.g., BT radio 106 (FIG. 1), to transmit a BT discovery packet.

As indicated at block 202, the method may include setting the initial reduced power. For example, cellular controller 110 (FIG. 1) may set the initial reduced power, e.g., as described above.

In one example, cellular controller 110 (FIG. 1) may set the initial reduced power by running an algorithm for a worst case scenario, e.g., as described above.

As indicated at block 204, the method may include sending an indication of the initial reduced power to a BT controller and adjusting the BT transmission power of the BT radio according to the initial reduced power. For example, cellular controller 110 (FIG. 1) may send an indication to BT controller 120 (FIG. 1) including the initial reduced power, and BT controller 120 (FIG. 1) may adjust the BT transmission power of BT radio 106 (FIG. 1) according to the initial reduced power, e.g., as described above.

As indicated at block 206, the method may include determining a first cellular channel noise level ("noise_ref_for_max_bt_power") on the cellular radio, e.g., based on a maximum transmission power level of the BT radio ("max_bt_power"). For example, cellular controller 110 (FIG. 1) may determine the cellular channel noise level on cellular radio 104 (FIG. 1) based on the default power level of BT radio 106 (FIG. 1).

As indicated at block 208, the method may include determining a second cellular channel noise level ("present_noise_without_bt") on the cellular radio without BT transmission, e.g., based on one or more cellular channel parameters. For example, cellular controller 110 (FIG. 1) may determine the second cellular channel noise level on cellular radio 104 (FIG. 1) based on the RSRP and/or RSRQ parameters.

As indicated at block 208, determining the second cellular channel noise level may include applying a margin ("bt_noise_margin") to the second cellular channel noise level.

In one example, the margin may include a predefined noise level below the second cellular channel noise level, e.g., 6 dB below the present_noise_without_bt.

As indicated at block 210, the method may include determining a reduced transmission power of the BT radio, e.g., based on the first and second cellular channel noise levels and the margin. For example, cellular controller 110 (FIG. 1) may determine the reduced transmission power ("CNV_SAFE_TX_POWER") of BT radio 106 (FIG. 1), e.g., based on the first and second cellular channel noise levels and the margin.

In one example, cellular controller 110 (FIG. 1) may determine the reduced transmission power of BT radio 106 (FIG. 1), e.g., as follows:

$$CNV\_SAFE\_TX\_POWER = \max\_bt\_power - (noise\_ref\_for\_max\_bt\_power - (present\_noise\_without\_bt - bt\_noise\_margin)) \quad (1)$$

As indicated at block 212, the method may include adjusting the reduced transmission power of the BT radio, e.g., based on noise level on the cellular radio. For example, BT controller 120 (FIG. 1) may adjust the reduced transmission power of BT radio 106 (FIG. 1), e.g., based on changes in the one or more one or more cellular channel parameters.

Referring back to FIG. 1, in some demonstrative embodiments, BT controller 120 may control BT radio 106 to transmit the BT discovery packets according to the reduced power level.

In some demonstrative embodiments, controller 120 may not block and/or terminate the BT discovery packets, for example, if the BT discovery packet is transmitted according to the reduced power level.

In some demonstrative embodiments, BT controller 120 may select to restrict the transmission power of the BT discovery packet based on one or more criteria.

In some demonstrative embodiments, BT controller 120 may select to restrict the transmission power of the BT discovery packet, for example, based on a comparison between the BT frequency of BT radio 106 and the cellular frequency of cellular radio 104.

In some demonstrative embodiments, BT controller 120 may select to restrict the transmission power of the BT discovery packet, for example, if the BT frequency interferes with the cellular frequency.

In one example, BT controller 120 may restrict the transmission power of the BT discovery packet if the BT frequency and the cellular frequency are adjacent and/or may interfere with each other.

In some demonstrative embodiments, BT controller 120 may select not to restrict the transmission power of the BT discovery packet, for example, if the BT discovery packet does not interfere with the communication of cellular radio 104 during the cellular downlink period.

In one example, BT controller 120 may select not to restrict the transmission power of the BT discovery packet, for example, if the BT frequency and the cellular frequency do not interfere with each other.

In some demonstrative embodiments, BT controller 120 may select not to restrict the transmission power of the BT discovery packet, for example, if cellular radio 104 does not communicate during the cellular downlink period.

In one example, cellular controller 110 may provide to BT controller 120, e.g., via interface 115, an indication of communications of cellular radio 104 during the cellular downlink period, for example, to enable BT radio 106 to transmit the BT discovery packet at the default power level during the cellular downlink period, e.g., when cellular radio 104 does not communicate.

In some demonstrative embodiments, BT controller 120 may select not to restrict the transmission power of the BT discovery packet.

In some demonstrative embodiments, BT controller 120 may control the transmission power of BT radio 106 according to the default power level during a cellular uplink period.

In some demonstrative embodiments, BT radio 106 may transmit the BT discovery packet according to the default power level during the cellular uplink period.

In some demonstrative embodiments, restricting the transmission power of BT radio 106 may enable BT radio 106 to transmit the connection packets during the cellular downlink period.

In some demonstrative embodiments, restricting the transmission power of BT radio 106 may reduce a discovery range of device 102. However, enabling BT radio 106 to transmit the connection packets during the cellular downlink period may enable BT radio 106 to transmit the connection packets to nearby devices, e.g., BT device 152, which may be located in proximity to device 102, during the cellular downlink period.

In some demonstrative embodiments, restricting the transmission power of BT radio 106 may reduce connection time of BT radio 106 to the nearby devices, e.g., since the connection packets to the nearby devices may not be "killed" during the cellular downlink period.

In one example, BT discovery packets to the nearby devices may be terminated, for example, if BT controller 120 does not restrict the transmission power of BT radio 106.

In some demonstrative embodiments, restricting the transmission power of BT radio 106 during the cellular downlink period may minimize interference from BT radio 106 to cellular radio 104, e.g., as described above.

Figure 3:
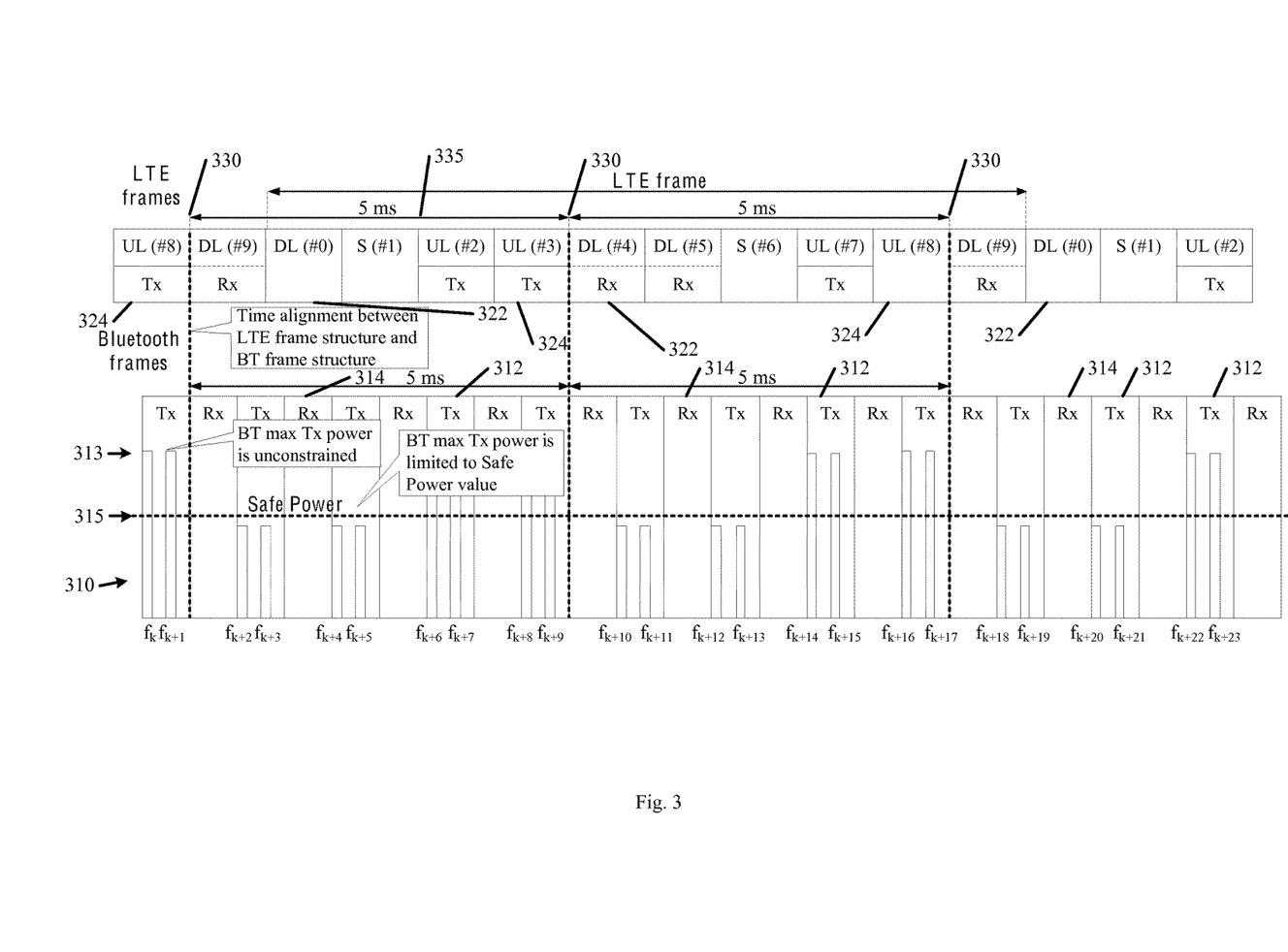
FIG. 3 is a time diagram depicting communication of a plurality of BT discovery packets, in accordance with some demonstrative embodiments.

Reference is made to FIG. 3, which schematically illustrates a time diagram 300 depicting communication of a plurality of BT discovery packets 310, denoted $f_k$ to $f_{k+23}$, versus transmission power levels of the plurality of BT discovery packets 310, in accordance with some demonstrative embodiments.

In some demonstrative embodiments, BT radio 106 (FIG. 1) may communicate the plurality of BT discovery packets 310.

As shown in FIG. 3, the plurality of BT discovery packets 310 may be transmitted during Tx time slots 312 of BT radio 106 (FIG. 1).

As shown in FIG. 3, responses to the plurality of BT discovery packets 310 may be received during Rx time slots 314 of BT radio 106 (FIG. 1).

As shown in FIG. 3, cellular radio 104 (FIG. 1) may communicate during a plurality of cellular downlink periods 322 and/or cellular uplink periods 324.

As shown in FIG. 3, BT controller 120 (FIG. 1) may control transmission power of one or more packets of the plurality of BT discovery packets 310 according to a default power level 313.

As shown in FIG. 3, the transmission power of packets $f_k$, $f_{k+1}$, $f_{k+6}$, $f_{k+7}$, $f_{k+8}$, and $f_{k+9}$, may be according to the default power level 313.

As shown in FIG. 3, BT controller 120 (FIG. 1) may control transmission power of packets $f_k$, $f_{k+1}$, $f_{k+6}$, $f_{k+7}$, $f_{k+8}$, and $f_{k+9}$ according to the default power level 313, e.g., during cellular uplink periods 324 of cellular radio 104 (FIG. 1).

As shown in FIG. 3, BT controller 120 (FIG. 1) may control transmission power of one or more packets of the plurality of BT discovery packets 310 according to a reduced power level 315.

As shown in FIG. 3, the transmission power of packets $f_{k+2}$, $f_{k+3}$, $f_{k+4}$, and $f_{k+5}$, may be according to the reduced power level 315.

As shown in FIG. 3, BT controller 120 (FIG. 1) may control transmission power of packets $f_{k+2}$, $f_{k+3}$, $f_{k+4}$, and $f_{k+5}$, according to the reduced power level 315, e.g., during cellular downlink periods 322 of cellular radio 104 (FIG. 1).

As shown in FIG. 3, the plurality of cellular downlink periods 322 and/or cellular uplink periods 324 may be synchronized to the plurality of BT discovery packets 310 at synchronization points 330.

As shown in FIG. 3, synchronization points 330 may occur every predefined period of time, for example, based on a duration on a cellular frame and a duration of a BT frame.

For example, synchronization points 330 may occur every 5 milliseconds (msec), e.g., if the duration of the cellular subframe is 1 msec and the duration of the BT frame is 1.25 msec.

In some demonstrative embodiments, the synchronization of cellular uplink periods 324 and the plurality of BT discovery packets 310, e.g., at synchronization points 330, may enable transmission of at least one BT discovery packet 310 according to the default power level 313 at a periodicity corresponding to the periodicity of synchronization points 330, e.g., every 5 msec.

In one example, the synchronization of cellular uplink periods 324 and the plurality of BT discovery packets 310 may enable transmission of packets $f_{k+8}$, and $f_{k+9}$ during a time period 335 between two adjacent synchronization points 330.

In some demonstrative embodiments, the ability to transmit the BT discovery packets at the reduced power level 315 may enable reduced search time to discover relatively closer devices, e.g., using the reduced power discovery packets, while maintaining the ability to discover relatively far BT devices, e.g., using the default power discovery packets.

In some demonstrative embodiments, receiving a response, e.g., in response to the reduced power level BT discovery packet may indicate that a discovered device is in close range to device 102 (FIG. 1). Accordingly, controller 120 (FIG. 1) may continue using the low power level, e.g., to further establish a connection with the discovered device. As a result, interferences to cellular radio 104 (FIG. 1) may be reduced, while reducing the connection time and/or enhancing user experience.

Figure 4:
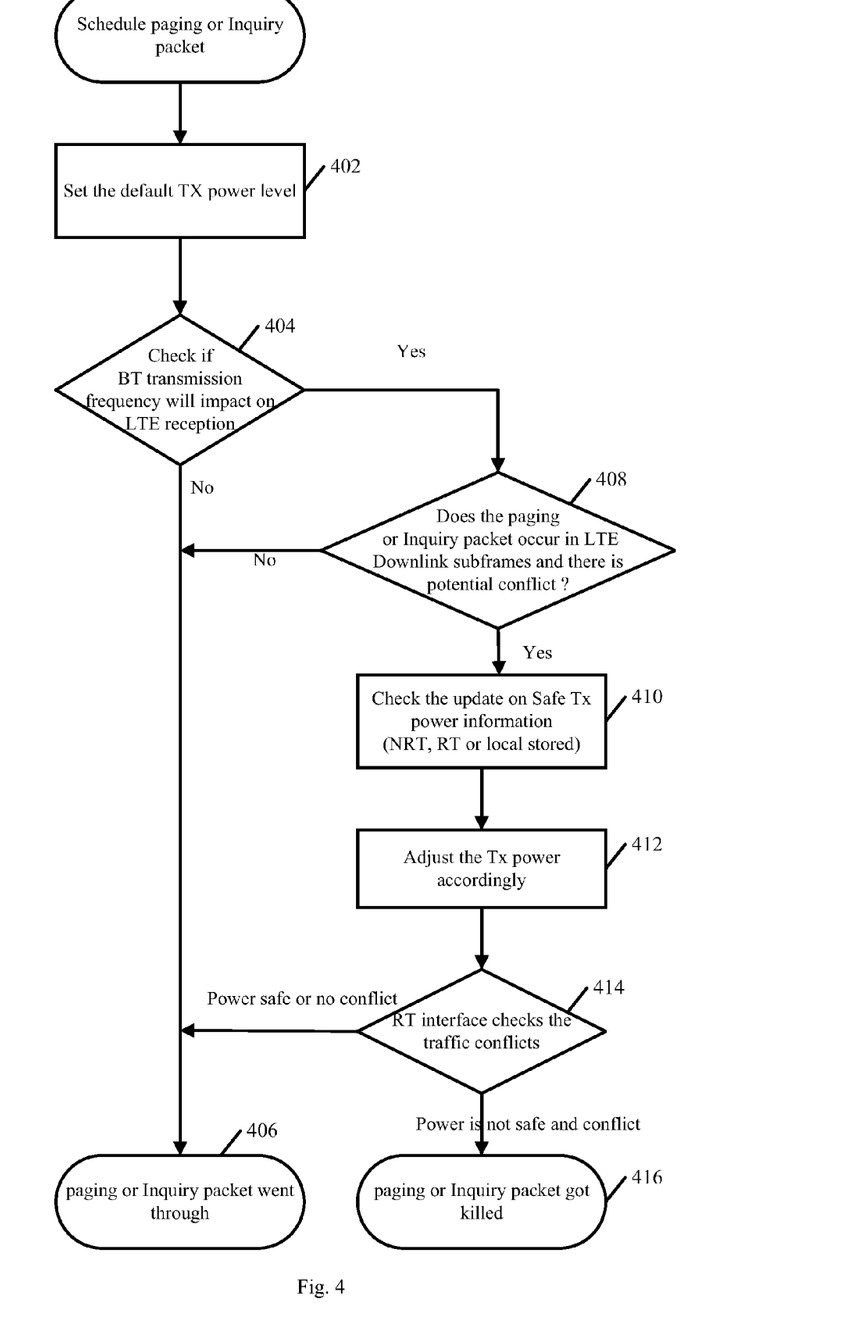
FIG. 4 is a schematic flow-chart illustration of a method of restricting a power transmission of a BT radio, in accordance with some demonstrative embodiments.

Reference is made to FIG. 4, which schematically illustrates a method of restricting a power transmission of a BT radio, in accordance with some demonstrative embodiments. In some demonstrative embodiments, one or more of the operations of the method of FIG. 4 may be performed by one or more elements of a system, e.g., system 100 (FIG. 1). In one example, one or more of the operations of the method of FIG. 4 may be performed at a multi-radio device, e.g., multi-radio device 102 (FIG. 1), for example, by a controller, e.g., cellular controller 110 (FIG. 1) and/or BT controller 120 (FIG. 1).

As indicated at block 402, the method may include setting a default power level of a BT radio. For example, BT controller 120 (FIG. 1) may control BT radio 106 (FIG. 1) to communicate according to the default power level, e.g., as described above.

As indicated at block 404, the method may include determining whether or not a BT frequency of the BT radio interferes with a cellular frequency of a cellular radio. For example, controller 120 (FIG. 1) may determine whether or not the BT frequency interferes with the cellular frequency of radio 104 (FIG. 1), e.g., as described above.

As indicated at block 406, the method may include communicating at least one BT discovery packet, for example, if the BT frequency does not interfere with the cellular frequency. For example, controller 120 (FIG. 1) may enable transmission of the BT discovery packet, for example, if the BT frequency does not interfere with the cellular frequency of cellular radio 104 (FIG. 1), e.g., as described above.

As indicated at block 408, the method may include determining whether or not a transmission of the BT discovery packet may be during a cellular downlink period, for example, if the BT frequency interferes with the cellular frequency. For example, controller 120 (FIG. 1) may determine whether or not the BT discovery packet may be during the cellular downlink period, e.g., as described above.

As indicated at block 406, the method may include communicating the at least one BT discovery packet, for example, if the transmission of the BT discovery packet is not during the cellular downlink period. For example, controller 120 (FIG. 1) may enable transmission of the BT discovery packet, for example, if the transmission of the BT discovery packet is not during the cellular downlink period, e.g., as described above.

As indicated at block 410, the method may include receiving an indication of the reduced power level, e.g., from storage and/or from the cellular controller. For example, BT controller 120 (FIG. 1) may receive the reduced power level from cellular controller 110 (FIG. 1) and/or from storage 136 (FIG. 1), e.g., as described above.

As indicated at block 412, the method may include restricting the transmission power of the BT discovery packet according to the reduced power level. For example, BT controller 120 (FIG. 1) may restrict the transmission power of the BT discovery packet according to the reduced power level, e.g., as described above.

As indicated at block 414, the method may include determining whether or not the transmission of the BT discovery packet according to the reduced power level may interfere with cellular communications during the cellular downlink period. For example, controller 120 (FIG. 1) may determine whether or not the BT discovery packet is to interfere with the cellular communications of cellular radio 104 (FIG. 1) during the cellular downlink period, e.g., as described above.

As indicated at block 406, the method may include communicating the BT discovery packet, for example, if the transmission of the BT discovery packet according to the reduced power level does not interfere with the cellular communications during the cellular downlink period. For example, controller 120 (FIG. 1) may enable transmission of the BT discovery packet, for example, if the transmission of the BT discovery packet according to the reduced power level does not interfere with the cellular communications of cellular radio 104 (FIG. 1) during the cellular downlink period, e.g., as described above.

As indicated at block 416, the method may include terminating the BT discovery packet, for example, if the transmission of the BT discovery packet according to the reduced power level is to interfere with the cellular communications during the cellular downlink period. For example, controller 120 (FIG. 1) may not enable the transmission of the BT discovery packet, for example, if the transmission of the BT discovery packet according to the reduced power level is to interfere with the cellular communications of cellular radio 110 (FIG. 1) during the cellular downlink period, e.g., as described above.

Figure 5:
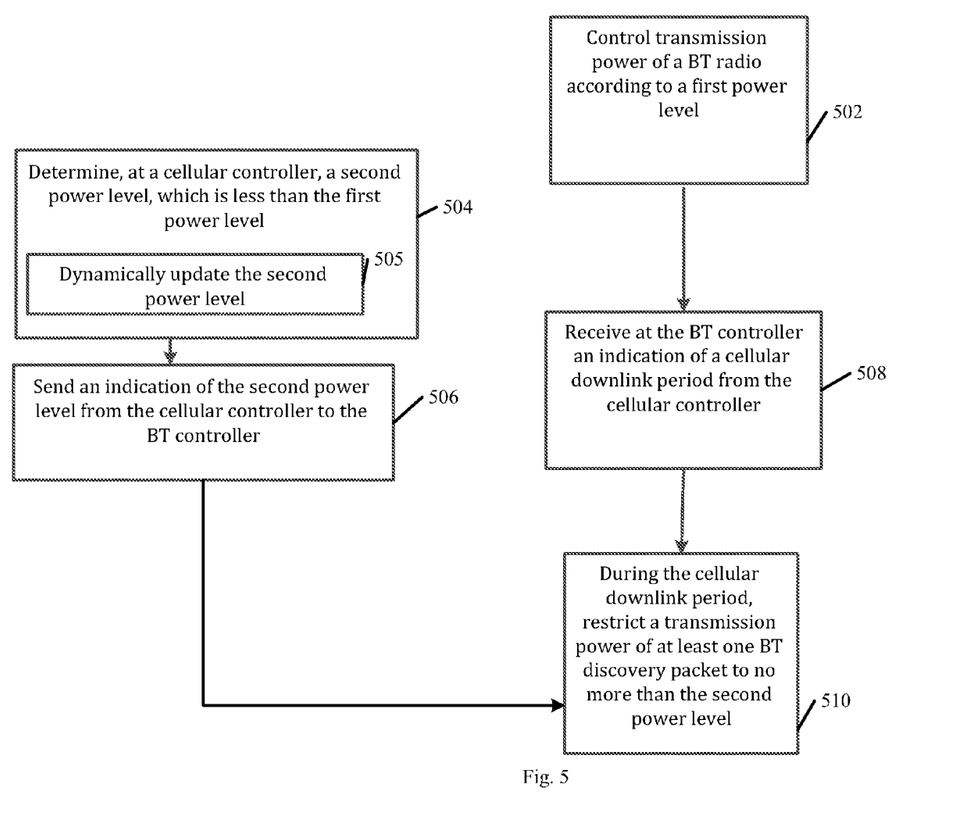
FIG. 5 is a schematic flow-chart illustration of a method of controlling communications of a multi-radio device, in accordance with some demonstrative embodiments.

Reference is made to FIG. 5, which schematically illustrates a method of a controlling communication of a multi-radio device, in accordance with some demonstrative embodiments. In some demonstrative embodiments, one or more of the operations of the method of FIG. 5 may be performed by one or more elements of a system, e.g., system 100 (FIG. 1). In one example, one or more of the operations of the method of FIG. 5 may be performed at a multi-radio device, e.g., multi-radio device 102 (FIG. 1), for example, by a controller, e.g., cellular controller 110 (FIG. 1) and/or BT controller 120 (FIG. 1).

As indicated at block 502 the method may include controlling transmission power of a BT radio according to a first power level. For example, BT controller 120 (FIG. 1) may control the transmission power of BT radio 106 (FIG. 1) according to the default power level, e.g., as described above.

As indicated at block 504 the method may include determining, at a cellular controller, a second power level, which is less than the first power level. For example, cellular controller 110 (FIG. 1) may determine the reduced power level, e.g., as described above.

As indicated at block 505, determining the second power level may include dynamically updating the second power level. For example, cellular controller 110 (FIG. 1) may dynamically update the reduced power level, e.g., as described above.

As indicated at block 506, the method may include sending an indication of the second power level from the cellular controller to the BT controller. For example, cellular controller 110 (FIG. 1) may send the indication of the reduced power level to BT controller 120 (FIG. 1), e.g., as described above.

As indicated at block 508, the method may include receiving at the BT controller an indication of a cellular downlink period from the cellular controller. For example, BT controller 120 (FIG. 1) may receive from cellular controller 110 (FIG. 1) the indication of the cellular downlink period, e.g., as described above.

As indicated at block 510, the method may include during the cellular downlink period, restricting a transmission power of at least one BT discovery packet to no more than the second power level. For example, BT controller 120 (FIG. 1) may restrict the transmission power of the at least one BT discovery packet to no more than the reduced power level during the cellular downlink period, e.g., as described above.

Figure 6:
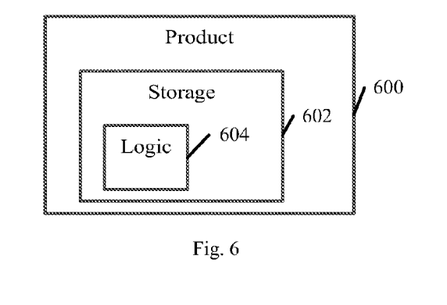
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of multi-radio device 102, cellular controller 110 (FIG. 1), BT controller 120 (FIG. 1), and/or to perform one or more of the operations of the method of FIG. 2, FIG. 4 and/or FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a multi-radio device comprising a cellular controller to control communication of a cellular radio; and a BT controller to control a transmission power of a BT radio according to a first power level, the BT controller is to receive from the cellular controller an indication of a cellular downlink period, and, during the cellular downlink period, to restrict a transmission power of at least one BT discovery packet to no more than a second power level, which is less than the first power level.

Example 2 includes the subject matter of Example 1, and optionally, wherein the cellular controller is to determine the second power level, and to send to the BT controller an indication of the second power level.

Example 3 includes the subject matter of Example 2, and optionally, wherein the cellular controller is to dynamically update the second power level.

Example 4 includes the subject matter of Example 3, and optionally, wherein the cellular controller is to dynamically update the second power level, based on a cellular channel noise.

Example 5 includes the subject matter of Example 4, and optionally, wherein the cellular controller is to determine a first cellular channel noise level of the cellular radio based on the first power level, and a second cellular channel noise level of the cellular radio based on one or more cellular channel parameters, the cellular controller is to update the second power level, based on the first and second cellular channel noise levels.

Example 6 includes the subject matter of any one of Examples 1-5, and optionally, wherein the cellular radio is to communicate over a first frequency during the cellular downlink period, and the BT radio is to transmit the BT discovery packet over a second frequency, the BT controller is to select to restrict the transmission power of the BT discovery packet, based on a comparison between the first and second frequencies.

Example 7 includes the subject matter of any one of Examples 1-6, and optionally, wherein the BT controller is to control the transmission power of the BT radio according to the first power level during a cellular uplink period.

Example 8 includes the subject matter of any one of Examples 1-7, and optionally, wherein the cellular downlink period comprises a downlink subframe period.

Example 9 includes the subject matter of any one of Examples 1-8, and optionally, wherein the at least one BT discovery packet comprises at least one packet selected from the group consisting of a BT inquiry packet and a BT paging packet.

Example 10 includes the subject matter of any one of Examples 1-9, and optionally, wherein the cellular radio comprises a Long Term Evolution (LTE) radio.

Example 11 includes the subject matter of any one of Examples 1-10 being a mobile device including one or more antennas, a processor, and a memory.

Example 12 includes a wireless communication system comprising one or more antennas; a processor; a memory; a Bluetooth (BT) radio; a cellular radio; a cellular controller to control communication of the cellular radio; and a BT controller to control a transmission power of the BT radio according to a first power level, the BT controller is to receive from the cellular controller an indication of a cellular downlink period, and, during the cellular downlink period, to restrict a transmission power of at least one BT discovery packet to no more than a second power level, which is less than the first power level.

Example 13 includes the subject matter of Example 12, and optionally, wherein the cellular controller is to determine the second power level, and to send to the BT controller an indication of the second power level.

Example 14 includes the subject matter of Example 13, and optionally, wherein the cellular controller is to dynamically update the second power level.

Example 15 includes the subject matter of Example 14, and optionally, wherein the cellular controller is to dynamically update the second power level, based on a cellular channel noise.

Example 16 includes the subject matter of Example 15, and optionally, wherein the cellular controller is to determine a first cellular channel noise level of the cellular radio based on the first power level, and a second cellular channel noise level of the cellular radio based on one or more cellular channel parameters, the cellular controller is to update the second power level, based on the first and second cellular channel noise levels.

Example 17 includes the subject matter of any one of Examples 12-16, and optionally, wherein the cellular radio is to communicate over a first frequency during the cellular downlink period, and the BT radio is to transmit the BT discovery packet over a second frequency, the BT controller is to select to restrict the transmission power of the BT discovery packet, based on a comparison between the first and second frequencies.

Example 18 includes the subject matter of any one of Examples 12-17, and optionally, wherein the BT controller is to control the transmission power of the BT radio according to the first power level during a cellular uplink period.

Example 19 includes the subject matter of any one of Examples 12-18, and optionally, wherein the cellular downlink period comprises a downlink subframe period.

Example 20 includes the subject matter of any one of Examples 12-19, and optionally, wherein the at least one BT discovery packet comprises at least one packet selected from the group consisting of a BT inquiry packet and a BT paging packet.

Example 21 includes the subject matter of any one of Examples 12-20, and optionally, wherein the cellular radio comprises a Long Term Evolution (LTE) radio.

Example 22 includes a method of wireless communication to be performed by a multi-radio device including a cellular controller to control communication of a cellular radio, and a Bluetooth (BT) controller to control communication of a BT radio, the method comprising controlling a transmission power of the BT radio according to a first power level; receiving at the BT controller an indication of a cellular downlink period from the cellular controller; and during the cellular downlink period, restricting a transmission power of at least one BT discovery packet to no more than a second power level, which is less than the first power level.

Example 23 includes the subject matter of Example 22, and optionally, comprising determining the second power level at the cellular controller, and sending an indication of the second power level from the cellular controller to the BT controller.

Example 24 includes the subject matter of Example 23, and optionally, comprising dynamically updating the second power level.

Example 25 includes the subject matter of Example 24, and optionally, comprising dynamically updating the second power level based on a cellular channel noise.

Example 26 includes the subject matter of Example 25, and optionally, comprising determining a first cellular channel noise level of the cellular radio based on the first power level, determining a second cellular channel noise level of the cellular radio based on one or more cellular channel parameters, and updating the second power level, based on the first and second cellular channel noise levels.

Example 27 includes the subject matter of any one of Examples 22-26, and optionally, wherein the cellular radio is to communicate over a first frequency during the cellular downlink period, and the BT discovery packet is to be transmitted over a second frequency, the method comprising selecting to restrict the transmission power of the BT discovery packet based on a comparison between the first and second frequencies.

Example 28 includes the subject matter of any one of Examples 22-27, and optionally, comprising controlling the transmission power of the BT radio according to the first power level during a cellular uplink period.

Example 29 includes the subject matter of any one of Examples 22-28, and optionally, wherein the cellular downlink period comprises a downlink subframe period.

Example 30 includes the subject matter of any one of Examples 22-29, and optionally, wherein the at least one BT discovery packet comprises at least one packet selected from the group consisting of a BT inquiry packet and a BT paging packet.

Example 31 includes the subject matter of any one of Examples 22-30, and optionally, wherein the cellular radio comprises a Long Term Evolution (LTE) radio.

Example 32 includes a product including one or more tangible computer-readable non-transitory storage media comprising computer-executable instructions operable to, when executed by at least one computer processor, enable the at least one computer processor to implement a method at a multi-radio device including a cellular controller to control communication of a cellular radio, and a Bluetooth (BT) controller to control communication of a BT radio, the method comprising controlling a transmission power of the BT radio according to a first power level; receiving at the BT controller an indication of a cellular downlink period from the cellular controller; and during the cellular downlink period, restricting a transmission power of at least one BT discovery packet to no more than a second power level, which is less than the first power level.

Example 33 includes the subject matter of Example 32, and optionally, wherein the method comprises determining the second power level at the cellular controller, and sending an indication of the second power level from the cellular controller to the BT controller.

Example 34 includes the subject matter of Example 33, and optionally, wherein the method comprises dynamically updating the second power level.

Example 35 includes the subject matter of Example 34, and optionally, wherein the method comprises dynamically updating the second power level based on a cellular channel noise.

Example 36 includes the subject matter of Example 35, and optionally, wherein the method comprises determining a first cellular channel noise level of the cellular radio based on the first power level, determining a second cellular channel noise level of the cellular radio based on one or more cellular channel parameters, and updating the second power level, based on the first and second cellular channel noise levels.

Example 37 includes the subject matter of any one of Examples 32-36, and optionally, wherein the cellular radio is to communicate over a first frequency during the cellular downlink period, and the BT discovery packet is to be transmitted over a second frequency, the method comprising selecting to restrict the transmission power of the BT discovery packet based on a comparison between the first and second frequencies.

Example 38 includes the subject matter of any one of Examples 32-37, and optionally, wherein the method comprises controlling the transmission power of the BT radio according to the first power level during a cellular uplink period.

Example 39 includes the subject matter of any one of Examples 32-38, and optionally, wherein the cellular downlink period comprises a downlink subframe period.

Example 40 includes the subject matter of any one of Examples 32-39, and optionally, wherein the at least one BT discovery packet comprises at least one packet selected from the group consisting of a BT inquiry packet and a BT paging packet.

Example 41 includes the subject matter of any one of Examples 32-40, and optionally, wherein the cellular radio comprises a Long Term Evolution (LTE) radio.

Example 42 includes an apparatus of wireless communication, the apparatus comprising means for controlling a cellular radio; and means for controlling a transmission power of a BT radio according to a first power level, to receive an indication of a cellular downlink period from the means for controlling the cellular radio, and, during the cellular downlink period, to restrict a transmission power of at least one BT discovery packet to no more than a second power level, which is less than the first power level.

Example 43 includes the subject matter of Example 42, and optionally, wherein the means for controlling the cellular radio is to determine the second power level, and to send to the BT controller an indication of the second power level.

Example 44 includes the subject matter of Example 43, and optionally, wherein the means for controlling the cellular radio is to dynamically update the second power level.

Example 45 includes the subject matter of Example 44, and optionally, wherein the means for controlling the cellular radio is to dynamically update the second power level, based on a cellular channel noise.

Example 46 includes the subject matter of Example 45, and optionally, wherein the means for controlling the cellular radio is to determine a first cellular channel noise level of the cellular radio based on the first power level, and a second cellular channel noise level of the cellular radio based on one or more cellular channel parameters, and to update the second power level, based on the first and second cellular channel noise levels.

Example 47 includes the subject matter of any one of Examples 42-46, and optionally, wherein the cellular radio is to communicate over a first frequency during the cellular downlink period, and the BT radio is to transmit the BT discovery packet over a second frequency, the means for controlling the transmission power of the BT radio is to select to restrict the transmission power of the BT discovery packet, based on a comparison between the first and second frequencies.

Example 48 includes the subject matter of any one of Examples 42-47, and optionally, wherein the means for controlling the transmission power of the BT radio is to control the transmission power of the BT radio according to the first power level during a cellular uplink period.

Example 49 includes the subject matter of any one of Examples 42-48, and optionally, wherein the cellular downlink period comprises a downlink subframe period.

Example 50 includes the subject matter of any one of Examples 42-49, and optionally, wherein the at least one BT discovery packet comprises at least one packet selected from the group consisting of a BT inquiry packet and a BT paging packet.

Example 51 includes the subject matter of any one of Examples 42-50, and optionally, wherein the cellular radio comprises a Long Term Evolution (LTE) radio.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A multi-radio device comprising:
   a cellular controller to control communication of a cellular radio; and
   a Bluetooth (BT) controller to control a transmission power of a BT radio according to a first power level, said BT controller is to receive from said cellular controller an indication of a cellular downlink period, and, during said cellular downlink period, to restrict a transmission power of at least one BT discovery packet to no more than a second power level, which is less than said first power level,
   wherein said cellular controller is to determine said second power level, and to send to said BT controller an indication of said second power level.

2. The multi-radio device of claim 1, wherein said cellular controller is to dynamically update said second power level.

3. The multi-radio device of claim 2, wherein said cellular controller is to dynamically update said second power level, based on a cellular channel noise.

4. The multi-radio device of claim 3, wherein said cellular controller is to determine a first cellular channel noise level of said cellular radio based on said first power level, and a second cellular channel noise level of said cellular radio based on one or more cellular channel parameters, said cellular controller is to update said second power level, based on said first and second cellular channel noise levels.

5. The multi-radio device of claim 1, wherein said cellular radio is to communicate over a first frequency during said cellular downlink period, and said BT radio is to transmit said BT discovery packet over a second frequency, said BT controller is to select to restrict said transmission power of said BT discovery packet, based on a comparison between said first and second frequencies.

6. The multi-radio device of claim 1, wherein said BT controller is to control the transmission power of said BT radio according to said first power level during a cellular uplink period.

7. The multi-radio device of claim 1, wherein said cellular downlink period comprises a downlink subframe period.

8. The multi-radio device of claim 1, wherein said at least one BT discovery packet comprises at least one packet selected from the group consisting of a BT inquiry packet and a BT paging packet.

9. The multi-radio device of claim 1, wherein said cellular radio comprises a Long Term Evolution (LTE) radio.

10. The multi-radio device of claim 1, comprising a mobile device including one or more antennas, a processor, and a memory.

11. A wireless communication system comprising:
    one or more antennas;
    a processor;
    a memory;
    a Bluetooth (BT) radio;
    a cellular radio;
    a cellular controller to control communication of said cellular radio; and
    a BT controller to control a transmission power of said BT radio according to a first power level, said BT controller is to receive from said cellular controller an indication of a cellular downlink period, and, during said cellular downlink period, to restrict a transmission power of at least one BT discovery packet to no more than a second power level, which is less than said first power level,
    wherein said cellular controller is to determine said second power level, and to send to said BT controller an indication of said second power level.

12. The system of claim 11, wherein said cellular radio is to communicate over a first frequency during said cellular downlink period, and said BT radio is to transmit said BT discovery packet over a second frequency, said BT controller is to select to restrict said transmission power of said BT discovery packet, based on a comparison between said first and second frequencies.

13. The system of claim 11, wherein said cellular controller is to dynamically update said second power level.

14. The system of claim 13, wherein said cellular controller is to dynamically update said second power level, based on a cellular channel noise.

15. A method of wireless communication to be performed by a multi-radio device including a cellular controller to control communication of a cellular radio, and a Bluetooth (BT) controller to control communication of a BT radio, the method comprising:
    controlling a transmission power of the BT radio according to a first power level;
    determining at said cellular controller a second power level, which is less than said first power level;
    sending an indication of said second power level from said cellular controller to said BT controller;
    receiving at said BT controller an indication of a cellular downlink period from said cellular controller; and
    during said cellular downlink period, restricting a transmission power of at least one BT discovery packet to no more than the second power level.

16. The method of claim 15 comprising dynamically updating said second power level, based on a cellular channel noise.

17. The method of claim 15 comprising dynamically updating said second power level.

18. A product including one or more tangible computer-readable non-transitory storage media comprising computer-executable instructions operable to, when executed by at least one computer processor, enable the at least one computer processor to implement operations at a multi-radio device including a cellular controller to control communication of a cellular radio, and a Bluetooth (BT) controller to control communication of a BT radio, the operations comprising:
    controlling a transmission power of the BT radio according to a first power level;
    determining at said cellular controller a second power level, which is less than said first power level;
    sending an indication of said second power level from said cellular controller to said BT controller;
    receiving at said BT controller an indication of a cellular downlink period from said cellular controller; and during said cellular downlink period, restricting a transmission power of at least one BT discovery packet to no more than the second power level.

19. The product of claim 18, wherein said cellular downlink period comprises a downlink subframe period.

20. The product of claim 18, wherein the operations comprise dynamically updating said second power level.

21. The product of claim 20, wherein the operations comprise dynamically updating said second power level based on a cellular channel noise.

22. The product of claim 21, wherein the operations comprise determining a first cellular channel noise level of said cellular radio based on said first power level, and a second cellular channel noise level of said cellular radio based on one or more cellular channel parameters, and updating said second power level, based on said first and second cellular channel noise levels.

23. The product of claim 18, wherein said cellular radio is to communicate over a first frequency during said cellular downlink period, and said BT discovery packet is to be transmitted over a second frequency, the operations comprising selecting to restrict said transmission power of said BT discovery packet based on a comparison between said first and second frequencies.

24. The product of claim 18, wherein the operations comprise controlling said transmission power of said BT radio according to said first power level during a cellular uplink period.

* * * * *